United States Patent
Lee

(10) Patent No.: US 6,441,987 B1
(45) Date of Patent: Aug. 27, 2002

(54) METHOD OF PARKING HARD DISK DRIVE HEAD

(75) Inventor: Bong-Jin Lee, Kumi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/223,722

(22) Filed: Dec. 31, 1998

(30) Foreign Application Priority Data

Dec. 31, 1997 (KR) ............................................. 97-82034

(51) Int. Cl.$^7$ ............................................. G11B 5/596
(52) U.S. Cl. .................................................. 360/78.04
(58) Field of Search ................................ 360/75, 78.04; 318/671, 686, 687, 107, 124, 127, 254, 138, 439, 560

(56) References Cited

U.S. PATENT DOCUMENTS

| | | | |
|---|---|---|---|
| 4,679,102 A | | 7/1987 | Wevers et al. ............... 360/75 |
| 4,890,176 A | | 12/1989 | Casey et al. |
| 5,395,066 A | * | 3/1995 | Yokoyama et al. ....... 360/75 X |
| 5,455,726 A | | 10/1995 | Liu |
| 5,602,691 A | * | 2/1997 | Iwabuchi ..................... 360/75 |
| 5,615,064 A | * | 3/1997 | Blank et al. ................... 360/75 |
| 5,663,846 A | * | 9/1997 | Masuoka et al. ............. 360/75 |
| 5,663,855 A | | 9/1997 | Kim et al. |
| 5,682,273 A | * | 10/1997 | Hetzler ........................ 360/75 |
| 5,729,399 A | | 3/1998 | Albrecht et al. .............. 360/75 |
| 5,828,522 A | | 10/1998 | Brown et al. ................ 360/75 |
| 5,838,515 A | * | 11/1998 | Mortazavi et al. ....... 360/78.12 |
| 6,061,258 A | * | 5/2000 | Galbiati et al. .............. 363/98 |

FOREIGN PATENT DOCUMENTS

JP          63-52316         *  3/1988

* cited by examiner

*Primary Examiner*—David Hudspeth
*Assistant Examiner*—K. Wong
(74) *Attorney, Agent, or Firm*—R. E. Bushnell, Esq.

(57) ABSTRACT

There is provided a method of parking a hard disk drive head, which can minimize an impact during head parking using an alternating current (AC). This method includes the steps of: determining whether no command is input during a predetermined time in a wake-up mode, or whether a power-off command is input; and moving the head to a parking area by driving an actuator to which the head is attached using an initially-set alternating current, if no command was input during the predetermined time or a power-off command was input. Accordingly, damage to the head and head suspension, caused by the collision of the head with a latch magnet because of an excess acceleration of the actuator during parking, can be prevented.

26 Claims, 4 Drawing Sheets

METHOD OF PARKING HARD DISK DRIVE HEAD

CLAIM OF PRIORITY

This application makes reference to, incorporates the same herein, and claims all benefits accruing under 35 U.S.C. §119 from an application entitled METHOD FOR PARKING THE HEAD IN HARD DISK DRIVE earlier filed in the Korean Industrial Property Office on the 31th day of December 1998, and there duly assigned Ser. No. 97-82034, a copy of which is annexed hereto.

BACKGROUND OF THE INVENTION

1. Technical Field

The present invention relates to a method of parking a hard disk drive head, and more particularly to a method of parking a hard disk drive head which can minimize an impact upon parking the head by using an alternating current.

2. Related Art

In general, a hard disk drive protects data recorded on a disk by fixing its head in a specific position during power off or in a sleep mode. That is, when a user does not operate the hard disk drive for some time, a spindle motor stops rotating the disk, and a voice coil motor moves the head to a parking area allocated close to the center of the disk, to prevent damage to the data if the disk drive suffers an external impact.

I have found that disk drive components including the head can be damaged during the parking of the head. Efforts have been made to improve disk drives to prevent such problems.

Exemplars of recent efforts in the art include U.S. Pat. No. 5,828,522 for VELOCITY CONTROL OF HEAD LOAD/UNLOAD MECHANISM IN A DISK DRIVE USING DITHER issued to Brown et al., U.S. Pat. No. 5,729,399 for CONTACT START/STOP DISK DRIVE WITH MINIMIZED HEAD-DISK WEAR IN TEXTURED LANDING ZONE issued to Albrecht et al., U.S. Pat. No. 5,663,855 for MAGNETIC LATCHING APPARATUS FOR AN ACTUATOR OF A HARD DISK DRIVE issued to Kim et al., U.S. Pat. No. 5,455,726 for VERSATILE HEAD POSITIONER STOP issued to Liu, U.S. Pat. No. 4,890,176 for CRASH STOP AND MAGNETIC LATCH FOR A VOICE COIL ACTUATOR issued to Casey et al., and U.S. Pat. No. 4,679,102 for METHOD AND MEANS FOR PARKING READ/WRITE HEADS IN A DISC DRIVE USING THE BACK-EMF OF THE SPINDLE MOTOR TO OPERATE A STEPPER MOTOR issued to Wevers et al.

While these recent efforts provide advantages, I note that they fail to adequately provide a method of parking a hard disk drive head which efficiently and conveniently prevents damage to disk drive components including the head.

SUMMARY OF THE INVENTION

To solve the above problems, it is an objective of the present invention to provide a method of parking a hard disk drive head which can reduce impacts to the head and the head suspension during parking.

To solve the above problems, it is a further objective of the present invention to provide a method of parking a disk drive head which can reduce impacts to the head and the head suspension during parking, using an alternating current instead of a direct current to park the head of the disk drive.

Accordingly, to achieve the above objectives and others, there is provided a method of parking a hard disk drive head, comprising the steps of: determining whether no command is input during a predetermined time in a wake-up mode, or whether a power-off command is input; and moving the head to a parking area by driving an actuator to which the head is attached using an initially-set alternating current, if no command was input during the predetermined time or a power-off command was input. The initially-set alternating current can be a square waveform as an example.

To achieve these and other objects in accordance with the principles of the present invention, as embodied and broadly described, the present invention provides a method, comprising: identifying when a predetermined quantity of time elapses, wherein a command signal is not received by a disk drive unit during said predetermined quantity of time; identifying when a power-off command signal is received by said disk drive unit; when said predetermined quantity of time elapses and said command signal is not received by said disk drive unit during said predetermined quantity of time, transporting a head of said disk drive unit to a parking area by driving an actuator coupled to said head using an initially-set alternating current; and when said power-off command signal is received by said disk drive unit, transporting said head of said disk drive unit to said parking area by driving said actuator coupled to said head using said initially-set alternating current.

To achieve these and other objects in accordance with the principles of the present invention, as embodied and broadly described, the present invention provides a method, comprising: identifying when a predetermined quantity of time elapses, wherein a command signal is not received by a disk drive unit during said predetermined quantity of time; and when said predetermined quantity of time elapses and said command signal is not received by said disk drive unit during said predetermined quantity of time, transporting a head of said disk drive unit to a parking area by driving an actuator coupled to said head using an initially-set alternating current, said alternating current controlling a speed of said head while said head is transported to said parking area.

To achieve these and other objects in accordance with the principles of the present invention, as embodied and broadly described, the present invention provides an apparatus, comprising: a disk having a data area storing first data and a separately located parking area not storing the first data; a transducer reading the first data from and writing the first data to said data area of said disk, said transducer being transported from said data area to said parking area when a power off signal is received, and said transducer being transported from said data area to said parking area when a command signal is not received during a predetermined quantity of time; an actuator being coupled to said transducer; a memory unit storing power data corresponding to a predetermined alternating current; and a control unit being coupled with said memory unit and said actuator, said control unit controlling said actuator by utilizing said alternating current corresponding to said power data, wherein said control unit controls said actuator to perform said transporting of said transducer to said parking area.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to exemplify the principles of this invention.

DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
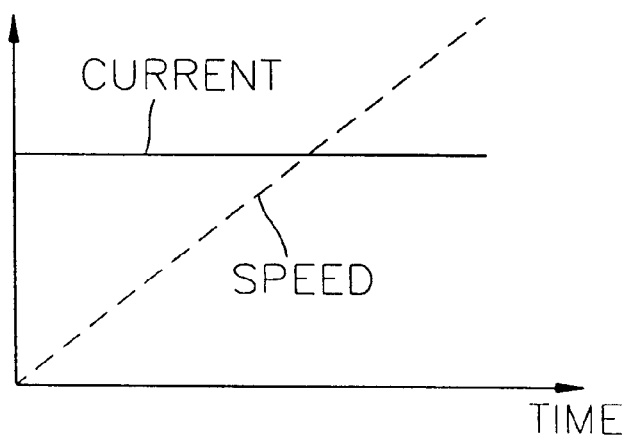
FIG. 1 illustrates the relationship between a voice coil driving current and the speed of an actuator during parking.

A first method of parking a head of a hard disk drive is as follows. When a microprocessor recognizes a power-off mode or a sleep mode, the voice coil motor drives an actuator to which a head is attached, and moves the head to a parking area. That is, a digital-to-analog converter converts a default digital value set in a central processing unit (CPU) to an analog value, and outputs the result to the voice coil motor. Then, the voice coil motor generates a torque using the analog current output from the digital-to-analog converter. This torque moves the head to the parking area. According to the aforementioned first method, a parking current is set as a direct current default value in the central processing unit (CPU) during parking. Thus, the movement speed of the actuator rapidly increases in linear proportion to time, as shown in FIG. 1. The FIG. 1 shows the relationship between a voice coil driving current and the speed of an actuator during parking. Accordingly, after the actuator is moved to the parking area, it collides with a latch magnet. The head suspension, which holds the head, may be bent due to the impact, particularly upon movement from the outermost circumference to the parking area. This can damage the head and cause defects in in the hard disk drive.

Figure 3:
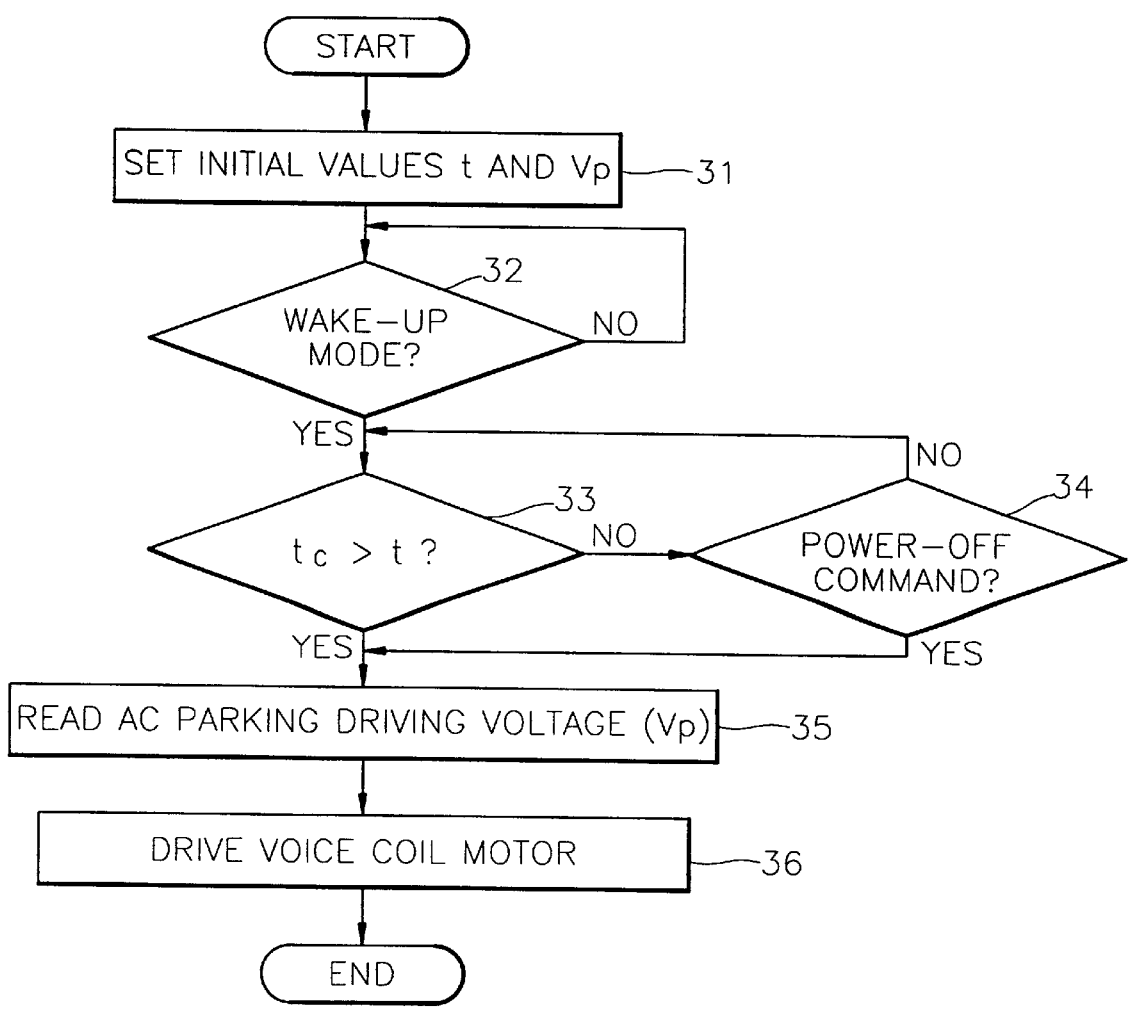
FIG. 3 is a flowchart illustrating a method of parking a hard disk drive head, in accordance with the principles of the present invention.

Turn now to FIG. 3, which shows a flowchart illustrating a method of parking a hard disk drive head, in accordance with the principles of the present invention. At step 31, referring to FIG. 3, if a new command is not input for certain time (t) after an already-executed command in a wake-up mode has been input, the time (t) for executing a sleep mode is set, and the driving voltage Vp of a voice coil motor for moving a head to a parking area is set during execution of the sleep mode. The set time and driving voltage are stored in a memory.

At step 32, it is determined whether the hard disk drive is currently in a wake-up mode, that is, not in a sleep mode. At step 33, after an execution command is input, it is determined whether the time ($t_c$) for which the next command is input exceeds the time (t) set in the initial value setting step 31. At step 34, it is determined whether the input command is a power-off command. At step 35, the alternating current (AC) parking driving voltage Vp set in step 31 is read from a memory.

At step 36, an actuator to which a head is attached is moved by driving a motor with a voltage (current) corresponding to the alternating current (AC) parking driving voltage (Vp) data read from the memory.

Figure 2:
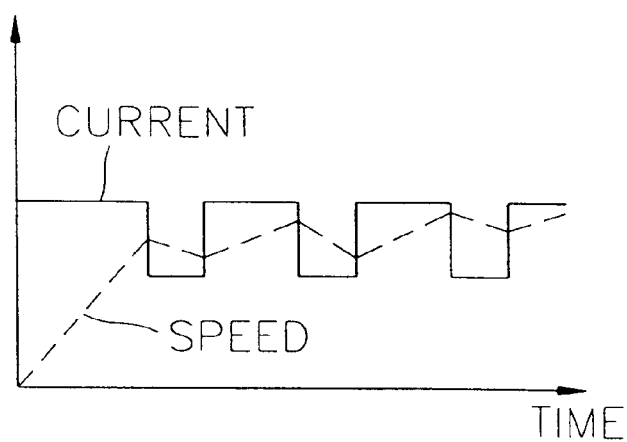
FIG. 2 illustrates the relationship between a voice coil driving current and the speed of an actuator during parking, in accordance with the principles of the present invention.
Figure 4:
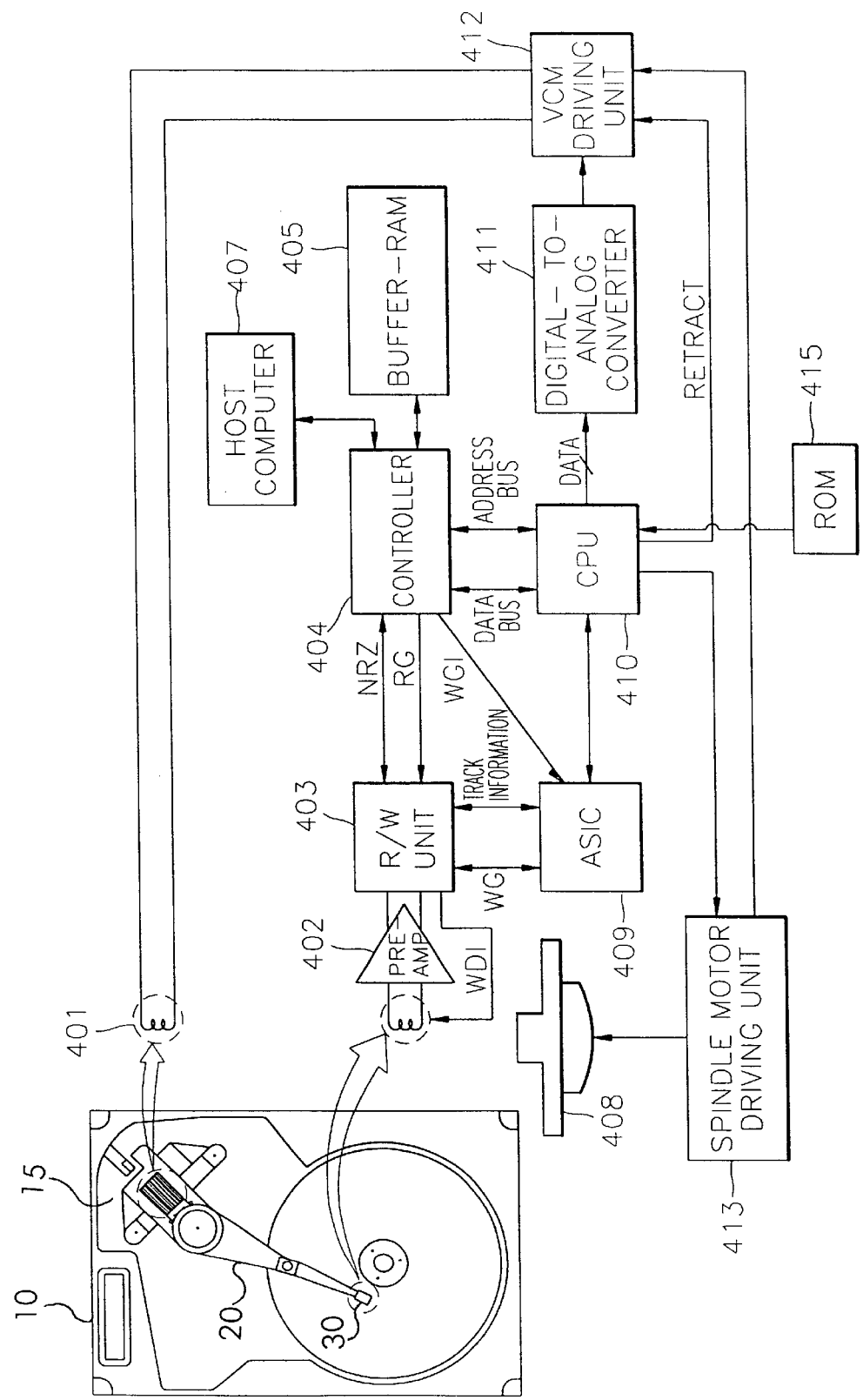
FIG. 4 is a block diagram illustrating a hard disk drive, in accordance with the principles of the present invention.
Figure 5:
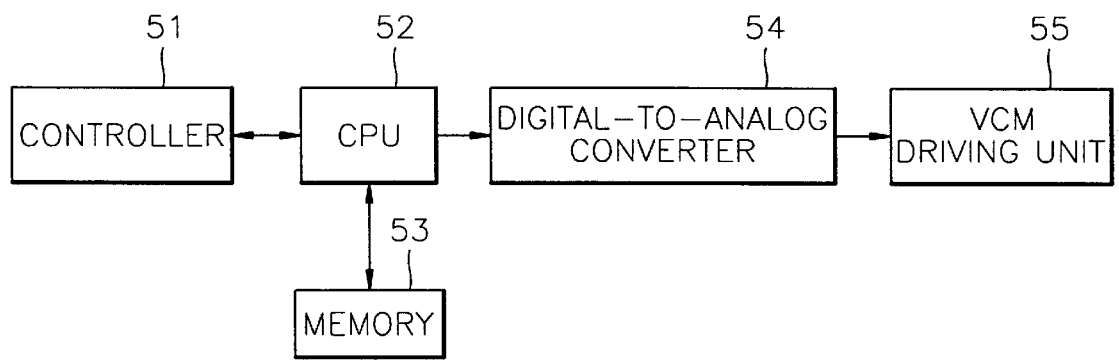
FIG. 5 is a block diagram including only blocks associated with the present invention among the blocks shown in FIG. 4, in accordance with the principles of the present invention.

FIG. 2 illustrates the relationship between a voice coil driving current and the speed of an actuator during parking, in accordance with the principles of the present invention. FIG. 4 is a block diagram illustrating a hard disk drive, in accordance with the principles of the present invention. FIG. 5 is a block diagram including only blocks associated with the present invention among the blocks shown in FIG. 4, in accordance with the principles of the present invention.

The present invention will now be described in detail referring to FIG. 5, based on the flowchart of FIG. 3. First, the time (t) and the driving voltage (Vp) data of the voice coil motor, which are set in step 31, are stored at a designated address of a memory 53.

The driving voltage (Vp) data of the voice coil motor must be set to have an alternating current value when it is converted into an analog value. As one embodiment, the driving voltage (Vp) data of the voice coil motor can be set to be a square wave as shown in FIG. 2, when the digital data is converted into an analog value. FIG. 2 illustrates the relationship between a voice coil driving current and the speed of an actuator during parking, in accordance with the principles of the present invention.

A controller 51 first determines whether the hard disk drive is in a wake-up mode. That is, it is determined whether the spindle motor rotates, and the head is in a data area for reading/writing, in step 32. If the hard disk drive is in the wake-up mode, a counter in the controller 51 is reset at the moment when a command is input, and begins counting. Next, the counting value $t_c$ of the counter is compared with the time (t) read from the memory 53. It is determined whether the counting value $t_c$ of the counter exceeds the time (t) set by the memory 53, in step 33. Also, it is determined whether a command input within the time (t) is a power-off command, in step 34.

If the count value $t_c$ of the counter exceeds the time (t), or a command input within the time (t) is a power-off command, then the controller 51 issues a command to a central processing unit (CPU) 52 to read out the driving voltage (Vp) data of the voice coil motor stored in the memory 53 and output the result to a digital-to-analog converter 54, in step 35.

Then, the digital-to-analog converter 54 converts the input driving voltage value (Vp) data of the digital voice coil motor into an analog value and outputs the result to a voice coil motor (VCM) driving unit 55. The voice coil motor driving unit 55 moves the head from a data area to a parking area by moving the actuator to which the head is attached, using the input alternating current (AC) driving voltage (Vp) data, in step 36.

Here, the driving voltage Vp of the voice coil motor for parking a head is set as an alternating current (AC) voltage, a square wave as an embodiment, instead of a direct current (DC) voltage in the aforementioned first method, so that the speed of the actuator increases nonlinearly and gently with time as shown in FIG. 2. The increase of the speed according to time can be appropriately determined by the duty cycle of the square wave.

Accordingly, during parking, the actuator to which the head is attached does not move rapidly, so that impact with the latch magnet can be minimized. Therefore, the head suspension can be prevented from being bent by the collision between the actuator and the latch magnet, and damage to the head can be prevented.

FIG. 4 shows spindle motor driving unit 413, an application specific integrated circuit (ASIC) 409, a central processing unit (CPU) 410, a voice coil motor (VCM) driving unit 412, a digital-to-analog (DA)converter 411, a read only memory (ROM) 415, a read/write (R/W) unit 403, a pre-amp 402, a controller 404, a buffer-random access memory (buffer-RAM) 405, and a host computer 407. The read/write unit 403 is also known as a read/write transducer 403. The read/write unit 403 is located at the head of the disk drive unit depicted in FIG. 4.

FIG. 4 also depicts a top view of the interior of disk drive 10. FIG. 4 illustrates an actuator 15, an arm 20 coupled to the actuator 15, a head 30 mounted at one end of the arm 20, a data area storing data, and a parking area where the head 30 can be parked. The head 30 is parked in the parking area when power to the disk drive 10 is turned off. The head 30 is also parked in the parking area when the disk drive 10 is not used during a predetermined period of time. The head 30 writes data to and reads data from the data area depicted in FIG. 4. The square wave depicted in FIG. 2 can be replaced with a sawtooth wave or a sinusoidal wave or with other alternating current waveforms.

According to the present invention as described above, an alternating current (AC) voltage, square wave voltage as an embodiment, instead of a direct current (DC) voltage is set and used as a driving voltage when parking a head, to prevent damage to the head and bending of the head suspension by the collision of the head with the latch magnet because of excess acceleration of the actuator after parking.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures maybe made from such details without departing from the spirit or scope of the applicant's general inventive concept.

What is claimed is:

1. A method, comprising:
   identifying when a predetermined quantity of time elapses, wherein a command signal is not received by a disk drive unit during said predetermined quantity of time;
   identifying when a power-off command signal is received by said disk drive unit;
   when said predetermined quantity of time elapses and said command signal is not received by said disk drive unit during said predetermined quantity of time, transporting a head of said disk drive unit to a parking area by driving an actuator coupled to said head using an initially-set alternating current; and
   when said power-off command signal is received by said disk drive unit, transporting said head of said disk drive unit to said parking area by driving said actuator coupled to said head using said initially-set alternating current.

2. The method of claim 1, wherein said initially-set alternating current corresponds to a square waveform.

3. The method of claim 1, further comprising storing first data in a memory unit coupled to said disk drive, said first data corresponding to said initially-set alternating current.

4. The method of claim 1, wherein said parking area is located apart from a data area of said disk drive, said head writing data to and reading data from said data area.

5. The method of claim 1, wherein said alternating current controls a speed of said head by controlling said driving of said actuator coupled to said head, when said head is transported to said parking area.

6. A method, comprising:
   identifying when a predetermined quantity of time elapses, wherein a command signal is not received by a disk drive unit during said predetermined quantity of time; and
   when said predetermined quantity of time elapses and said command signal is not received by said disk drive unit during said predetermined quantity of time, transporting a head of said disk drive unit to a parking area by driving an actuator coupled to said head using an initially-set alternating current, said alternating current controlling a speed of said head while said head is transported to said parking area.

7. The method of claim 6, wherein said initially-set alternating current corresponds to a square waveform.

8. A method, comprising:
   identifying when a predetermined quantity of time elapses, wherein a command signal is not received by a disk drive unit during said predetermined quantity of time; and
   when said predetermined quantity of time elapses and said command signal is not received by said disk drive unit during said predetermined quantity of time, transporting a head of said disk drive unit to a parking area by driving an actuator coupled to said head using an initially-set alternating current, said alternating current controlling a speed of said head while said head is transported to said parking area, wherein said initially-set alternating current corresponds to a sawtooth waveform.

9. A method, comprising:

identifying when a predetermined quantity of time elapses, wherein a command signal is not received by a disk drive unit during said predetermined quantity of time; and when said predetermined quantity of time elapses and said command signal is not received by said disk drive unit during said predetermined quantity of time, transporting a head of said disk drive unit to a parking area by driving an actuator coupled to said head using an initially-set alternating current, said alternating current controlling a speed of said head while said head is transported to said parking area, wherein said initially-set alternating current corresponds to a sinusoidal waveform.

10. The method of claim 7, further comprising storing first data in a memory unit coupled to said disk drive, said first data corresponding to said initially-set alternating current.

11. The method of claim 6, wherein said parking area is located apart from a data area of said disk drive, said head writing data to and reading data from said data area.

12. An apparatus, comprising:

a disk having a data area storing first data and a separately located parking area not storing the first data;

a transducer reading the first data from and writing the first data to said data area of said disk, said transducer being transported from said data area to said parking area when a power off signal is received, and said transducer being transported from said data area to said parking area when a command signal is not received during a predetermined quantity of time;

an actuator being coupled to said transducer;

a memory unit storing power data corresponding to a predetermined alternating current; and a control unit being coupled with said memory unit and said actuator, said control unit controlling said actuator by utilizing said alternating current corresponding to said power data, wherein said control unit controls said actuator to perform said transporting of said transducer to said parking area.

13. The apparatus of claim 12, wherein said alternating current corresponds to a square waveform.

14. The apparatus of claim 12, wherein said alternating current is utilized to control a speed of said transducer when said transducer is transported to said parking area.

15. The apparatus of claim 13, wherein said data area of said disk further comprises a plurality of data tracks.

16. The apparatus of claim 12, wherein said data area of said disk further comprises a plurality of data tracks.

17. The apparatus of claim 12, further comprising a spindle motor connected to said disk rotating said disk.

18. The apparatus of claim 17, wherein said parking area is located adjacent to a center of rotation of said disk.

19. The apparatus of claim 17, wherein said actuator transports said transducer generally radially above said data area of said disk.

20. The apparatus of claim 19, wherein said alternating current corresponds to a square waveform.

21. A method, comprising:

identifying when a predetermined quantity of time elapses, wherein a command signal is not received by a disk drive unit during said predetermined quantity of time;

identifying when a power-off command signal is received by said disk drive unit;

when said predetermined quantity of time elapses and said command signal is not received by said disk drive unit during said predetermined quantity of time, transporting a head of said disk drive unit to a parking area by driving an actuator using an initially-set alternating current, said actuator being coupled to said head; and when said power-off command signal is received by said disk drive unit, transporting said head of said disk drive unit to said parking area by driving said actuator coupled to said head using said initially-set alternating current, said initially-set alternating current corresponding to a waveform selected from among a plurality of waveforms not including a square waveform.

22. A method, comprising:

identifying when a predetermined quantity of time elapses, wherein a command signal is not received by a disk drive unit during said predetermined quantity of time; and when said predetermined quantity of time elapses and said command signal is not received by said disk drive unit during said predetermined quantity of time, transporting a head of said disk drive unit to a parking area by driving an actuator using an initially-set alternating current, said actuator being coupled to said head, said initially-set alternating current controlling a speed of said head while said head is transported to said parking area, said initially-set alternating current corresponding to at least one waveform selected from among a plurality of waveforms not including a square waveform.

23. An apparatus, comprising:

a disk having a data area storing first data and a separately located parking area not storing the first data;

a transducer reading the first data from and writing the first data to said data area of said disk, said transducer being transported from said data area to said parking area when a power off signal is received, and said transducer being transported from said data area to said parking area when a command signal is not received during a predetermined quantity of time;

an actuator being coupled to said transducer;

a memory unit storing power data corresponding to a predetermined alternating current; and a control unit being coupled with said memory unit and said actuator, said control unit controlling said actuator by utilizing said alternating current corresponding to said power data, wherein said control unit controls said actuator to perform said transporting of said transducer to said parking area, said predetermined alternating current corresponding to a waveform selected from among a plurality of waveforms not including a square waveform.

24. A method, comprising:

identifying when a predetermined quantity of time elapses, wherein a command signal is not received by a disk drive unit during said predetermined quantity of time;

identifying when a power-off command signal is received by said disk drive unit;

when said predetermined quantity of time elapses and said command signal is not received by said disk drive unit during said predetermined quantity of time, transporting a head of said disk drive unit to a parking area by driving an actuator using an initially-set alternating current and not using fed back information of speed of said actuator, said actuator being coupled to said head; and when said power-off command signal is received by said disk drive unit, transporting said head of said disk drive unit to said parking area by driving said actuator coupled to said head using said initially-set alternating current, said initially-set alternating current corresponding to a waveform selected from among a plurality of waveforms not including a square waveform.

25. A method, comprising:

identifying when a predetermined quantity of time elapses, wherein a command signal is not received by a disk drive unit during said predetermined quantity of time; and when said predetermined quantity of time elapses and said command signal is not received by said disk drive unit during said predetermined quantity of time, transporting a head of said disk drive unit to a parking area by driving an actuator using an initially-set alternating current and not using closed loop control, said actuator being coupled to said head, said initially-set alternating current controlling a speed of said head while said head is transported to said parking area, said initially-set alternating current corresponding to at least one waveform selected from among a plurality of waveforms not including a square waveform.

26. An apparatus, comprising:

a disk having a data area storing first data and a separately located parking area not storing the first data;

a transducer reading the first data from and writing the first data to said data area of said disk, said transducer being transported from said data area to said parking area when a power off signal is received, and said transducer being transported from said data area to said parking area when a command signal is not received during a predetermined quantity of time;

an actuator being coupled to said transducer;

a memory unit storing power data corresponding to a predetermined alternating current; and a control unit being coupled with said memory unit and said actuator, said control unit controlling said actuator by utilizing said alternating current corresponding to said power data and not utilizing fed back information of speed of said actuator, wherein said control unit controls said actuator to perform said transporting of said transducer to said parking area, said predetermined alternating current corresponding to a waveform selected from among a plurality of waveforms not including a square waveform.

* * * * *